United States Patent [19]

Thimon et al.

[11] Patent Number: 5,125,209
[45] Date of Patent: Jun. 30, 1992

[54] METHOD FOR CREASING PACKAGING FILMS

[75] Inventors: Jacques Thimon, St. Louis, Mo.; Jack Morantz, Westmount, Canada

[73] Assignee: Newtec International, Aix-Les-Bains, France

[21] Appl. No.: 702,890

[22] Filed: May 20, 1991

Related U.S. Application Data

[62] Division of Ser. No. 576,698, Aug. 31, 1990, Pat. No. 5,016,427.

[30] Foreign Application Priority Data

Sep. 6, 1989 [FR] France .................. 89 11638

[51] Int. Cl.$^5$ ............................................ B65B 11/04
[52] U.S. Cl. .................................... 53/399; 53/441
[58] Field of Search ............... 53/399, 441, 556, 141, 53/587, 588, 389.4

[56] References Cited

U.S. PATENT DOCUMENTS

| | | | |
|---|---|---|---|
| 2,700,544 | 1/1955 | Chambon | 226/183 X |
| 3,674,942 | 7/1972 | SuGaya | 226/183 X |
| 4,109,445 | 8/1978 | Shulman | 53/198 R |
| 4,119,445 | 10/1978 | Bosch et al. | 148/36 |
| 4,204,377 | 5/1980 | Lancaster et al. | 53/556 X |
| 4,235,062 | 11/1986 | Lancaster | 53/441 X |
| 4,255,918 | 3/1981 | Lancaster | 53/556 |
| 4,317,322 | 3/1982 | Lancaster | 53/556 X |
| 4,325,918 | 4/1982 | Luke | |
| 4,514,955 | 5/1985 | Mouser | 53/389.4 |
| 4,587,796 | 5/1986 | Haloila | 53/588 |
| 4,718,219 | 1/1988 | Schurtz | 53/556 |
| 4,790,125 | 12/1988 | Merritt | 226/180 X |
| 4,862,768 | 9/1989 | Humphrey | 53/556 |
| 4,905,451 | 3/1990 | Jaconelli | 53/587 X |
| 5,040,356 | 8/1991 | Thimon | 53/441 |

FOREIGN PATENT DOCUMENTS

| | | |
|---|---|---|
| 0177413 | 4/1986 | European Pat. Off. . |
| 0220712 | 5/1987 | European Pat. Off. . |
| 1220712 | 4/1959 | France . |
| 2281275 | 3/1976 | France . |
| 2468506 | 5/1981 | France . |
| 2470056 | 5/1981 | France . |
| 2489780 | 3/1982 | France . |
| 2571655 | 4/1986 | France . |
| 2571656 | 4/1986 | France . |
| 2573059 | 5/1986 | France . |
| 2059906 | 4/1981 | United Kingdom . |
| 2069957 | 9/1981 | United Kingdom . |

Primary Examiner—John Sipos
Attorney, Agent, or Firm—Body, Vickers & Daniels

[57] ABSTRACT

A method for unwinding packaging film is provided for a carriage which includes a stand, a supporting shaft for a film reel and a roller device, and the carriage is intended to be incorporated in a packaging machine for wrapping loads. Plastic film is removed from a roll and is longitudinally stretched between two rollers, has its width reduced and longitudinal creases put into it, and is associated with the load to be wrapped. Between the stretching rollers and end film unwinding roller, the film passes through a slit of a creasing member which reduces the width of the film by forming longitudinally extending creases along its width. The overall width reduction of the film is controlled by controlling the longitudinal angle of the slit relative to the axis of the stretch and unwinding rollers.

8 Claims, 10 Drawing Sheets

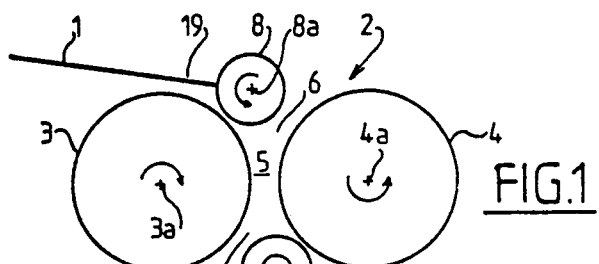
FIG.1
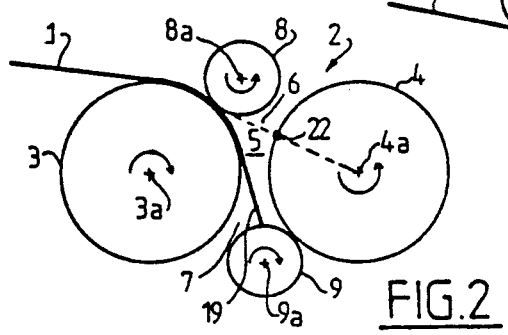
FIG.2
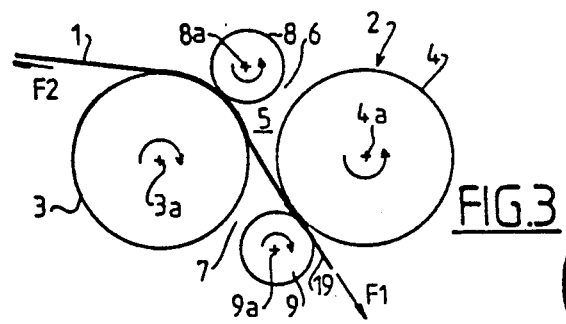
FIG.3
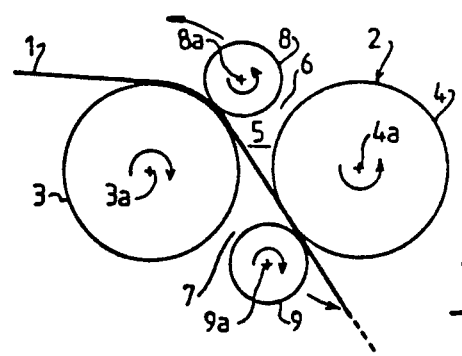
FIG.4
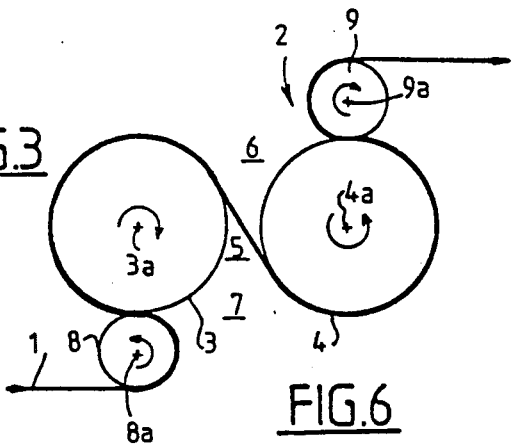
FIG.5
FIG.6

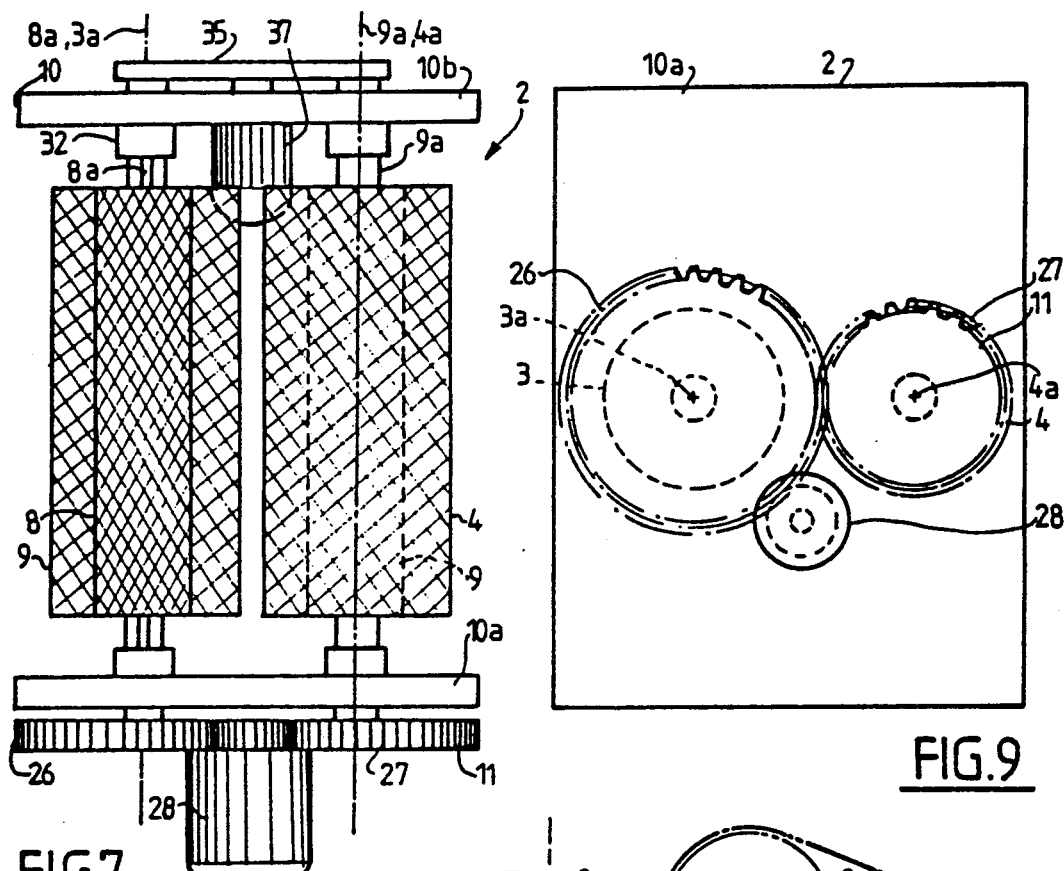
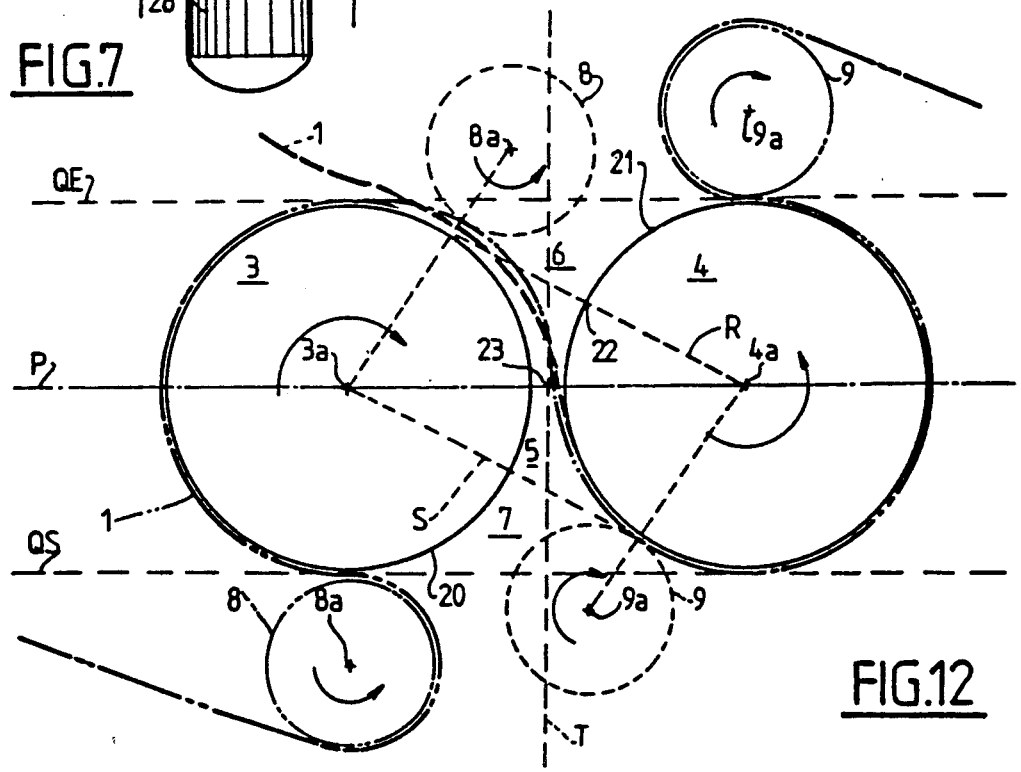

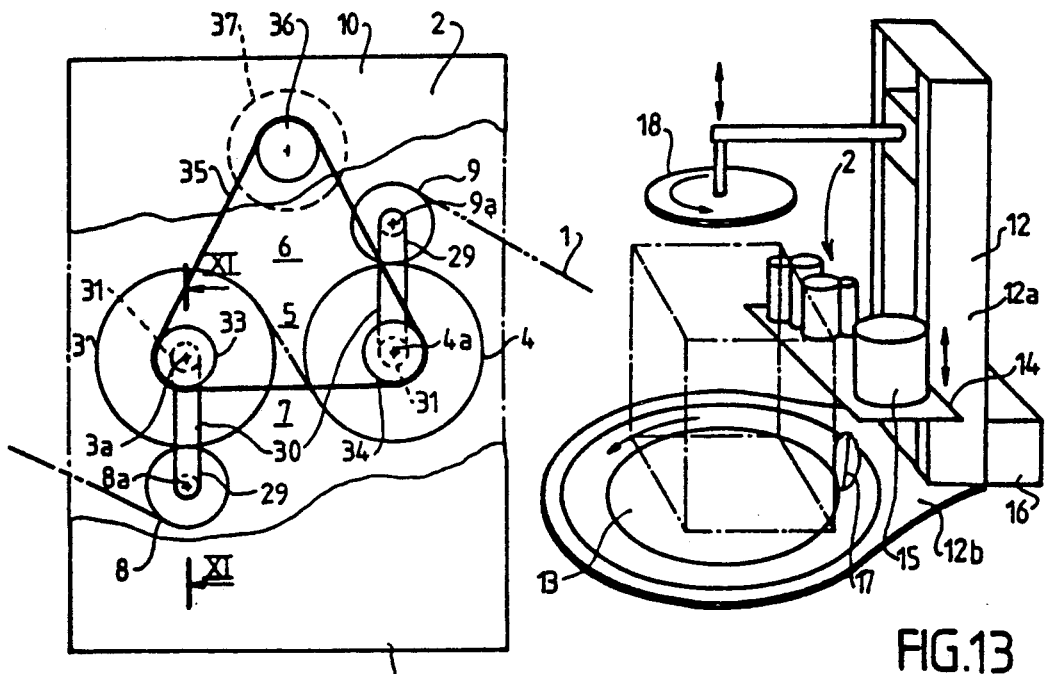
FIG.8
FIG.13
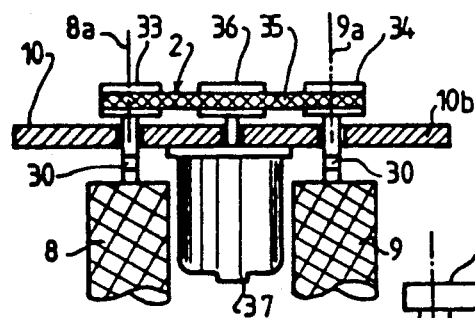
FIG.10
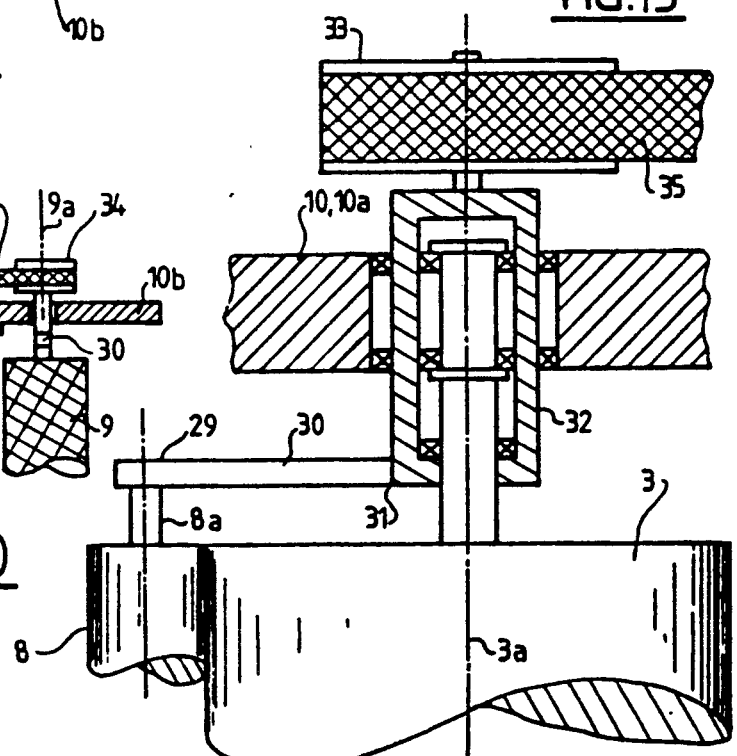
FIG.11

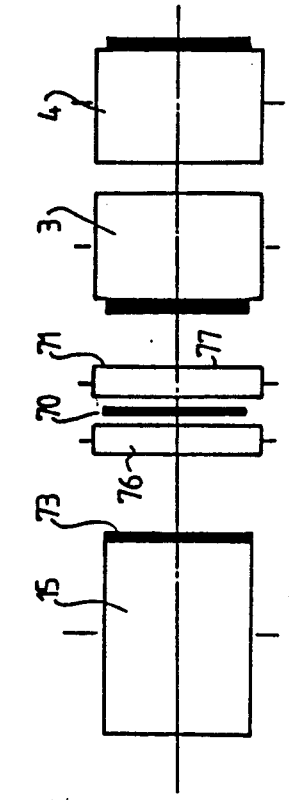 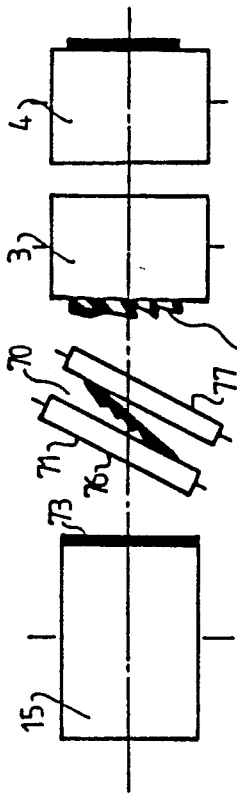 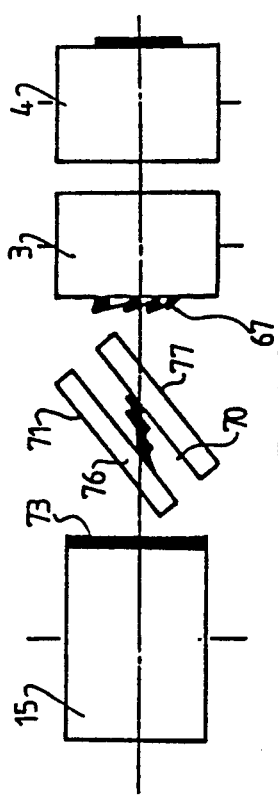
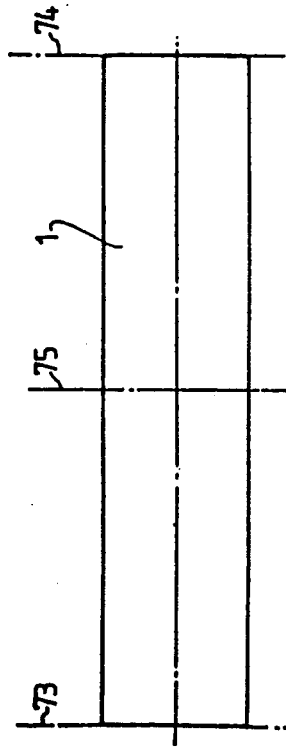
FIG.23A
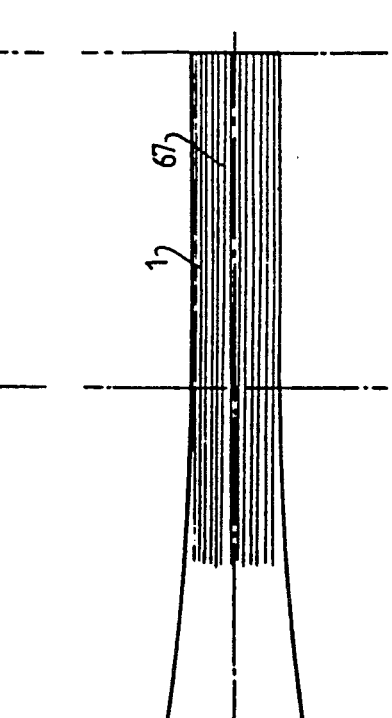
FIG.23B
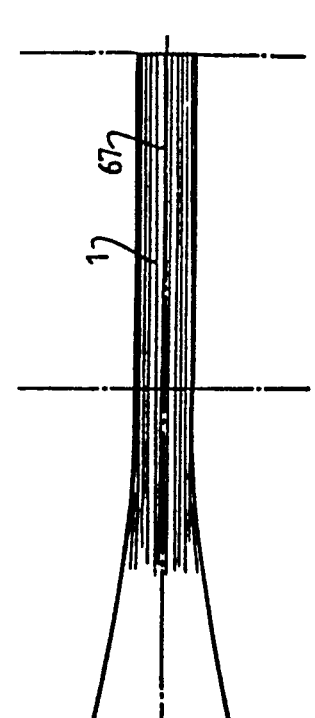
FIG.23C

METHOD FOR CREASING PACKAGING FILMS this is a division of application Ser. No. 576,698 filed Aug. 31, 1990 now U.S. Pat. No. 5,016,427.

Machines are known for packaging a load by means of a web of deformable packaging film, comprising means for supporting the load; a film reel which, when unwound, makes it possible to supply film in web form; means for supporting the film reel; and means for effecting a relative displacement of the load (or of its supporting means) and of the film reel (or of its supporting means), for the purpose of ensuring that the load is covered with the film. The film can cover the entire load or part of this. It can be solid or be open-work in the manner of a net. The packaging can be more or less sealing or, on the contrary, ventilated. The web can be of such a breadth that a single turn is sufficient to cover the load or, on the contrary, of a smaller breadth, in which case the packaging is usually helical with a plurality of turns. The packaging can be reinforced in some places. Typically, the packaging can involve the vertical faces of a palletized load or the faces perpendicular to a vertical plane. The packaging machines are of a type with a linear relative movement of the load and/or of pivoting type. In the latter case, either the load pivots about a vertical axis, the axis of the film reel remaining stationary, the table supporting the load being mounted pivotably, or the axis of the film reel pivots about a vertical axis round the load, the latter being stationary. Or the load is displaced horizontally along a track passing through a vertical ring, on which the film reel of horizontal axis is mounted. All the packaging machines of these types can be manual, semi-automatic or automatic. In the latter case, they generally have means for the crosscutting of the film and means for fixing the film to itself or to the load.

For example, to lay a film web helically onto the vertical faces of a palletized load, there is already a process known in which the load is brought onto a table; the film coming from a film reel of vertical axis carried by a carriage is passed over one or more rollers of vertical axes; then, in succession, the initial free end part of the film is fixed to the load; the table and therefore the load are driven in rotation about a vertical axis; and the carriage is driven upwards and downwards between two upper and lower end positions in relation to the rotation of the table; once the wrapping has been completed, the film is cut transversely in the vicinity of the load and the terminal free end part of the film is fixed to the load or to the wrapped film.

A machine for carrying out this process is of the type comprising a stationary stand; a load-receiving table carried by the stand and mounted pivotably about its vertical axis so as to be capable of selectively being blocked in terms of rotation or driven in rotation by driving and blocking means and control means; a stationary vertical mast carried by the stand and forming a support; bearings for supporting a film reel of vertical axis which are carried by a carriage; rollers carried by the carriage which is mounted slidably on the mast vertically upwards and downwards between two upper and lower end positions and which is driven slidably by driving means associated with control means associated with the control means of the table.

The state of the art is illustrated by some machines of the series known by the same of "DRA-PAL" marketed by the companies of the NEWTEC INTERNATIONAL group or machines of Messrs. MULLER MANUFACTURING INC. They are known to an average person skilled in the art as being machines for the vertical helical wrapping of a palletized load on a turntable.

Also known are machines of another type (the documents EP-A-0,177,413, FRA-1,220,712, U.S. Pat. No. 4,109,445 and U.S. Pat. No. 4,587,796 or the machine marketed by the NEWTEC INTERNATIONAL group under the name of "DRA-PAL OCTOPUS"), comprising a stand, a table which supports the palletized load in a fixed position during the wrapping of the load and with which can be associated means for the delivery and the means for the discharge of the load, such as roller conveyors; a moveable carriage for supporting a film reel of a generally vertically directed axis; mechanical means for supporting and guiding the carriage which are carried by the stand and which are such that the carriage can be moved in a movement occurring as a result of the combination of a horizontal looping movement around the load and of a vertical sliding; and means for driving the carriage which are capable of ensuring its effective movement especially along an at least substantially helical path of vertical axis surrounding the load. The mechanical means for supporting and guiding the carriage can have a plurality of alternative embodiments: rotary arm (the documents EP-A-0,177,413, EP-A-0,220,712 and U.S. Pat. No. 4,119,445) or horizontal frame which surrounds the load and is moveable in a vertical direction and along which the carriage is moved (the document U.S. Pat. No. 4,587,796), or an assembly moveable along a ring surrounding the load. In one possible version, the machine is not automatic (the document U.S. Pat. No. 4,109,445), and in this case the initial securing of the film web to the load, the final crosscutting of the film web and the association of the terminal end part of the film web with the wrapped load are carried out manually. In another version, these operations are executed automatically, the wrapping machine being automatic and for this purpose possessing, carried by supporting means, means for the crosscutting of the film web which are activated at the end of the wrapping of the load; means for the temporary retention of the initial end part of the film web coming from the film reel which are active before the start of wrapping; means for associating the terminal end part of the film web with a wrapped load which are active at the end of the wrapping; and means of retention and means of association (the documents EP-A-0,177,413 and U.S. Pat No. 4,587,796).

With a machine of the latter type, a helical wrapping of the vertical lateral faces of a palletized load can be carried out, and for this purpose a load to be wrapped is brought to and placed on the supporting table in a fixed position; the initial end part of the film web coming from the film reel is retained against a vertical face of the load, the load always remaining stationary, the film reel is unwound, and the load is wrapped with the film web coming from the reel, the film delivery rate being determined so as to match the type of wrapping carried out; this produces at least one turn of film web on the load; the film web is cut transversely; the terminal end part of the film web is associated with the wrapped load; and, on the one hand, the new initial end part of the film web is retained and, on the other hand, the wrapped load is discharged in such a way that another wrapping process with another load can begin again.

According to a likewise known embodiment, a helical wrapping is carried out, at the start of the wrapping process the film reel being in the lower end position, that is to say in its relative position nearest to the table in the vertical direction; the film reel is then displaced in a rising helical movement about the load until the film web covers its vertical lateral faces. Subsequently, a falling helical movement of the film reel is executed in order to produce a second layer of film web covering and crossing over the first layer produced during the rising helical wrapping, this taking place until the film reel returns to its initial position in the lower end position.

Preferably, and in accordance with the tendency which has been found, stretchable film, also possessing the characteristic of being more or less self-adhesive, is used. In this respect, the film is stretched longitudinally, especially beyond its elastic limit, and thus stretched is laid against the load. A plurality of techniques for the longitudinal stretching of the film are known for this purpose: the conventional technique using the relative braking of the film reel in relation to the film demand defined by the load, or the more recent technique, known as "prestretching", in which the film is stretched independently of the load and for this purpose, before being laid against the load, passes from an upstream zone at a particular running speed to a downstream zone at a running speed higher than the preceding one. This technique of prestretching can be carried out with a motorized or non-motorized prestretching device with two upstream and downstream rollers or with a single roller, as emerges from the documents FR-A-2,281,275, FR-A-2,468,506, FR-A-470,056, FR-A-2,289,780, FR-A-2,571,655 and FR-A-2,571,656 and from the existence of a prestretching device known by the name of "DYNA-DRAPEUR" marketed by the companies of the NEWTEC INTERNATIONAL group.

The film reel and the prestretching rollers (where a prestretching device with a plurality of rollers is concerned) are generally carried by a carriage, on which they are in the vicinity of one another. Moreover, this carriage is usually relatively near to the load or to the other component members of the machine. The result of this is that access to the carriage and to the prestretching rollers most often becomes difficult. This is made even more complicated because the prestretching device also possesses guide rollers. This difficulty of access makes the manual positioning of the film complicated and lengthy. But it is also dangerous since the prestretching rollers pivot in opposite directions, their pivoting being simultaneous, so that the operator can trap his fingers when the film is being positioned. This positioning difficulty is also greatly increased by the fact that the film is of large breadth (for example, of the order of 40 to 70 cm), highly deformable and therefore without any inherent stability and, finally, to some extent self-adhesive. This problem is all the more troublesome because the tendency to seek high degrees of stretching (of the order of many times the elastic limit of the film) and the generalization of these packaging techniques (for example, also including those for loads with cutting edges) make the probability that the film will tear all the greater. Also, this problem in the end affects the performances of these packaging techniques, not only because the positioning of the film requires a substantial machine stoppage time, but also because each positioning results in a waste of an appreciable length of film, just when the "high-technology" films themselves are more costly.

These problems of positioning the film have already been raised, but have been solved only with regard to the film reel alone (as is claimed in the document FR-A-2,573,059). This document provides an apparatus for unwinding a reel of packaging film, having a unwinding shaft designed for receiving the reel, a drive system with rollers parallel to the shaft, and stressing means for laying a driving roller of the drive system against the outer surface of the reel. The unwinding shaft is supported by bearings at its upper end, and its lower end is free. This unwinding shaft comprises a radial clamping mechanism consisting of fingers articulated on the unwinding shaft and actuated by a handwheel located in an upper position. According to this document, the positioning of the reel together with its finger system and control handwheel is combined with a retractable guide roller fixed to the drive system and interacting with a stationary ramp in order to move the drive system away from the shaft during a vertical displacement of a support of the drive system. A change of reel therefore involves the following successive steps: lowering of the support to bring the reel to the ground; release of the handwheel; raising of the support and disconnection of the reel and unwinding shaft; the placing of a new reel on the ground; lowering of the support; clamping of the handwheel; raising of the support to lay this drive system against the reel; lowering of the support after the retraction of the roller. Consequently, with such a system the positioning of the reel remains especially complex and lengthy, the more so because the structure of the unwinding apparatus with which the document FR-A-2,573,059 is concerned necessitates a pressure contact (spring) of the roller drive system against the film reel.

With regard to a-process and a machine with a prestretching of the film by means of a prestretching device, it has been proposed to use a film of original breadth L and subsequently to obtain a reduction of this in order to bring it to a smaller value 1, the web laid against the load being that of reduced breadth. The breadth reduction provided by the state of the art is obtained by passing the film web forcibly between two rods arranged in a plane perpendicular to the film web and perpendicular to the trace of the film web on this plane. The two rods are spaced from one another by the value 1, that is to say the reduced breadth. The two free longitudinal edges of the film web moving along a wider path than the spacing of the two rods interfere mechanically with the two rods, thereby causing a "rolled turnover" of these edges on themselves in the manner of a rope. The film web of reduced breadth thus has a central part without any substantial modification and with the central part of the web of original breadth and, on its two longitudinal edges, two "rolled turnovers" forming a kind of hem. This state of the art is well illustrated particularly in the documents GB-A-2,069,957, U.S. Pat. No. 4,204,377, U.S. Pat. No. 4,235,062 and U.S. Pat. No. 4,255,918.

It was found that, contrary to the teachings of the state of the art, it was not always desirable, and indeed was even somewhat disadvantageous, to produce a film web of reduced breadth by calibrating the film and by forming longitudinal "rolled turnovers" at its edges: in fact, the thickness of the film web varies to too great an extent, and this can affect the packaging; the breadth obtained is not always uniform; there is an appreciable friction of the film web on the rods. Moreover, it becomes all the more difficult to obtain such a breadth reduction because the problem of positioning the film in the prestretching device is itself complex, as already mentioned.

The object of the invention is, therefore, to solve the problems arising from the use of a packaging film, especially the positioning of the film and the reduction of its breadth.

To achieve this, the invention provides a process for using a carriage for unwinding packaging film, comprising a stand; a supporting shaft for a film reel to allow the pivoting of the reel and the unwinding of the film; a device with rollers of axes parallel to that of the supporting shaft; this carriage being intended to be incorporated in a packaging machine; this process involving:

an initial phase for associating a reel with a supporting shaft;

a subsequent phase for positioning the film web in the roller device comprising two upstream and downstream main rollers, defining between them a passage having an entry orifice and an exit orifice and designed to pivot about their axes in opposite directions, and two upstream and downstream guide rollers of axes parallel to the axes which in their operational location are respectively set apart upstream from the entry orifice and downstream from the exit orifice;

a phase of unwinding the film for the packaging of the load, wherein, in the phase of positioning the film web:

the starting point is an initial state in which the upstream and downstream guide rollers are relatively displaced from their final operational location to a temporary initial positioning location, where they are respectively nearest to the entry orifice and to the exit orifice;

in an initial introduction phase, an initial end of the film is introduced between the upstream main roller and guide roller and in the direction of the downstream main roller;

in a subsequent running phase, the upstream and downstream main rollers are pivoted about their axes, and a particular length of film is made to run in the direction of its introduction into the device;

and in a final positioning phase, as a result of a relative displacement the upstream and downstream guide rollers are brought from their initial location to their final operational location, the effect of this being to bend the film, at the same time laying it against the upstream and downstream main rollers.

The invention also relates to a carriage for unwinding packaging film, comprising a stand; a supporting shaft for a film reel carried by the stand; a roller device carried by the stand and of axes parallel to that of the supporting shaft; this carriage being intended to be incorporated in a packaging machine; the roller device comprising two upstream and downstream main rollers set transversely apart and of parallel axes, but near to one another, defining between them a passage for the packaging film and having an entry orifice and an exit orifice, said main rollers being designed to pivot simultaneously about their axes in opposite directions by appropriate means; two upstream and downstream film guide rollers which are associated with the upstream and downstream main rollers and the axes of which are parallel to one another and to the axes, in their final operational location, said guide rollers being respectively moved away upstream from the entry orifice and downstream from the exit orifice, wherein there are, carried by the stand, selectively controlled means for displacement with blocking, capable of allowing a relative displacement, with blocking in one of the two end postitions, of the guide rollers in relation to the axes of the main rollers, the guide rollers being either in the final operational location or in a temporary initial positioning location, where they are associated with the main rollers respectively nearest to the entry orifice and to the exit orifice.

The other characteristics of the invention will emerge from the description which follows with reference to the accompanying drawings in which:

FIGS. 1 to 6 are six diagrammatic axial end views of a carriage according to the invention (only the main rollers and the guide rollers are shown) at a plurality of successive moments in the phase of positioning the film, namely FIG. 1 illustrates the temporary initial location of the guide rollers and the initial delivery of the film;

FIG. 2 illustrates the initial this same location;

FIGS. 3 and 4 illustrate the running phase, still with the guide rollers in this same location;

FIG. 5 illustrates an intermediate position in the final positioning phase; and

FIG. 6 illustrates the operational device, the guide rollers being in their final operational location, the film traveling through the device.

FIG. 7 is a simplified partial elevation view of a carriage according to the invention, showing the means for positioning the film.

FIG. 8 is a partial top view of the carriage of FIG. 7, illustrating an alternative version of the means capable of allowing the displacement of the guide rollers.

FIG. 9 is a partial bottom view of the carriage of FIG. 7, illustrating an alternative version of means capable of allowing a differential speed of the two prestretching rollers (higher downstream than upstream).

FIG. 10 is a partial diagrammatic elevation view of the upper part of the carriage according to the version of FIG. 8, showing the means capable of allowing the displacement of the guide rollers and their arrangement.

FIG. 11 is a partial view on a larger scale, illustrating the mounting and arrangement, according to one possible version, of a main roller and of the associated guide roller.

FIG. 12 is a view comparable to that of FIGS. 1 to 6, but on a larger scale, the introduction states being represented by dashes and the operational states by dot-and-dash lines, both as regards the guide rollers and as regards the film FIG. 13 is a diagrammatic perspective view of one of the possible versions of a packaging machine receiving the carriage according to the invention (a machine of the type with a turntable rotating about a vertical axis).

Figure 14:
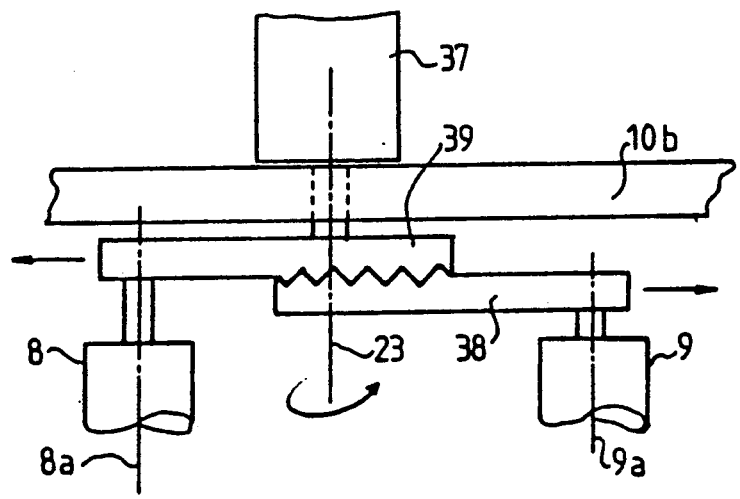
Figure 15:
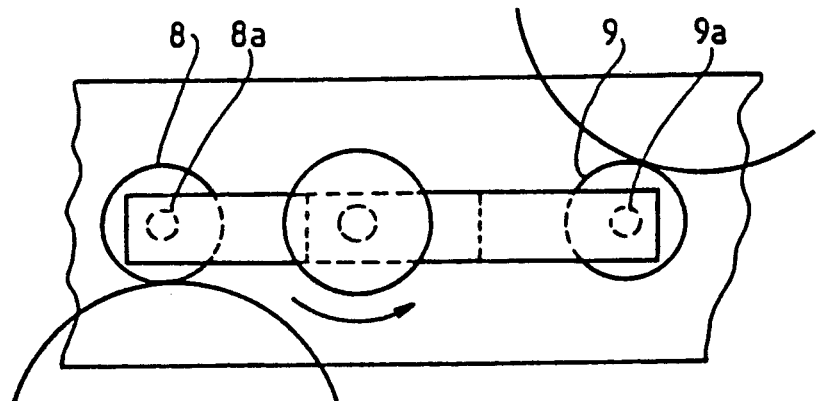

FIGS. 14 and 15 are respectively two partial diagrammatic elevation and axial end views of another version of the means capable of allowing the displacement of the guide rollers (a version with a pivoting frame).

Figure 16:
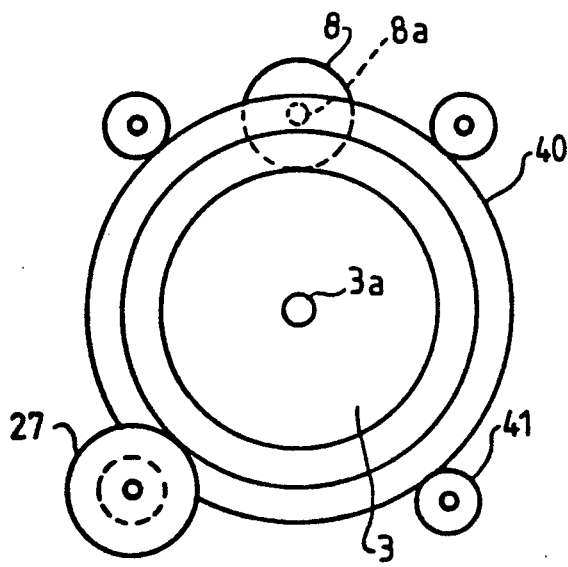

FIG. 16 is another diagrammatic axial end view of another version of these means (a version with a rotary ring).

Figure 17:
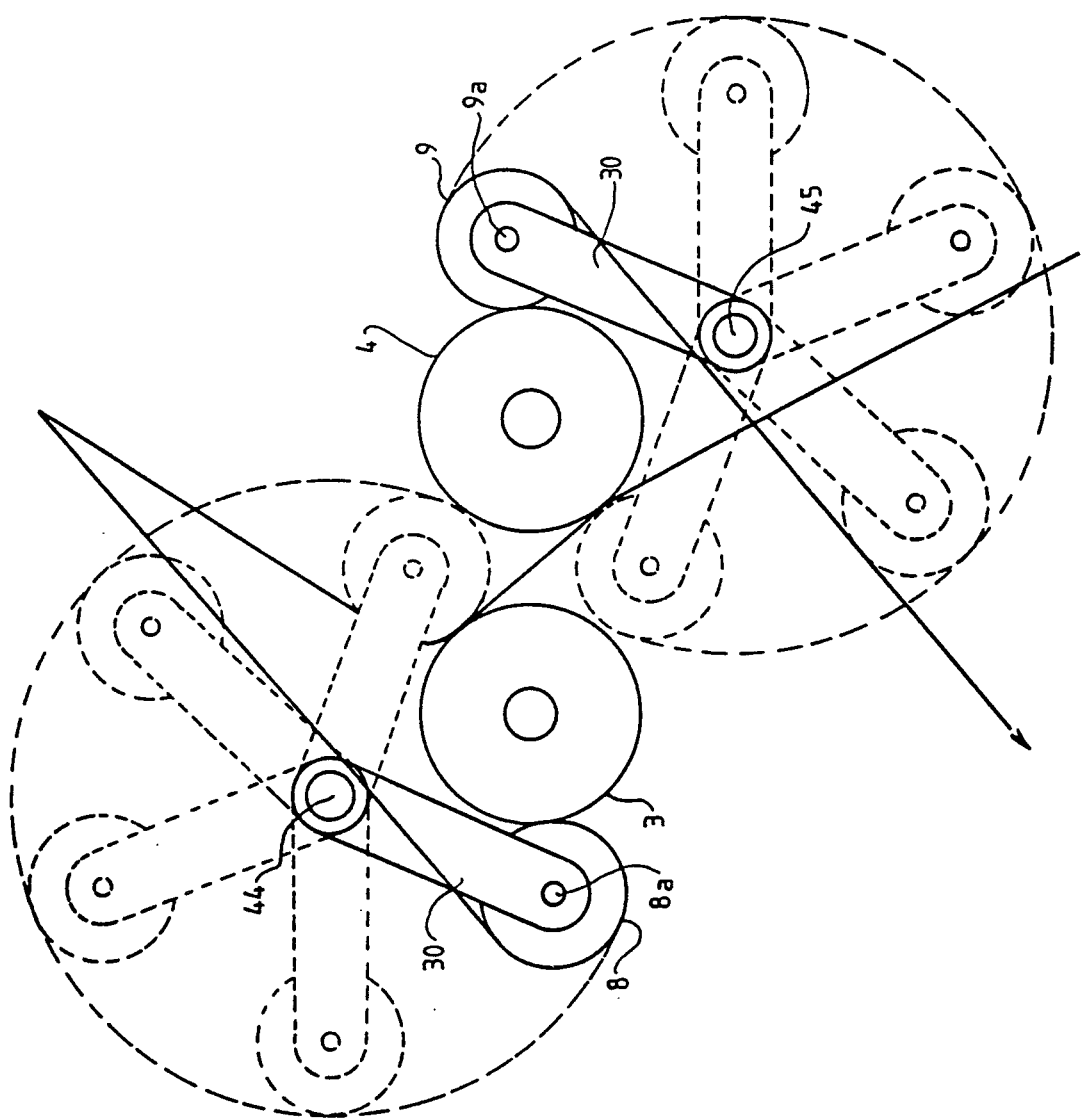

FIG. 17 is another diagrammatic axial end view illustrating another version of these means (a version with links of offset pivot axes).

Figure 18:
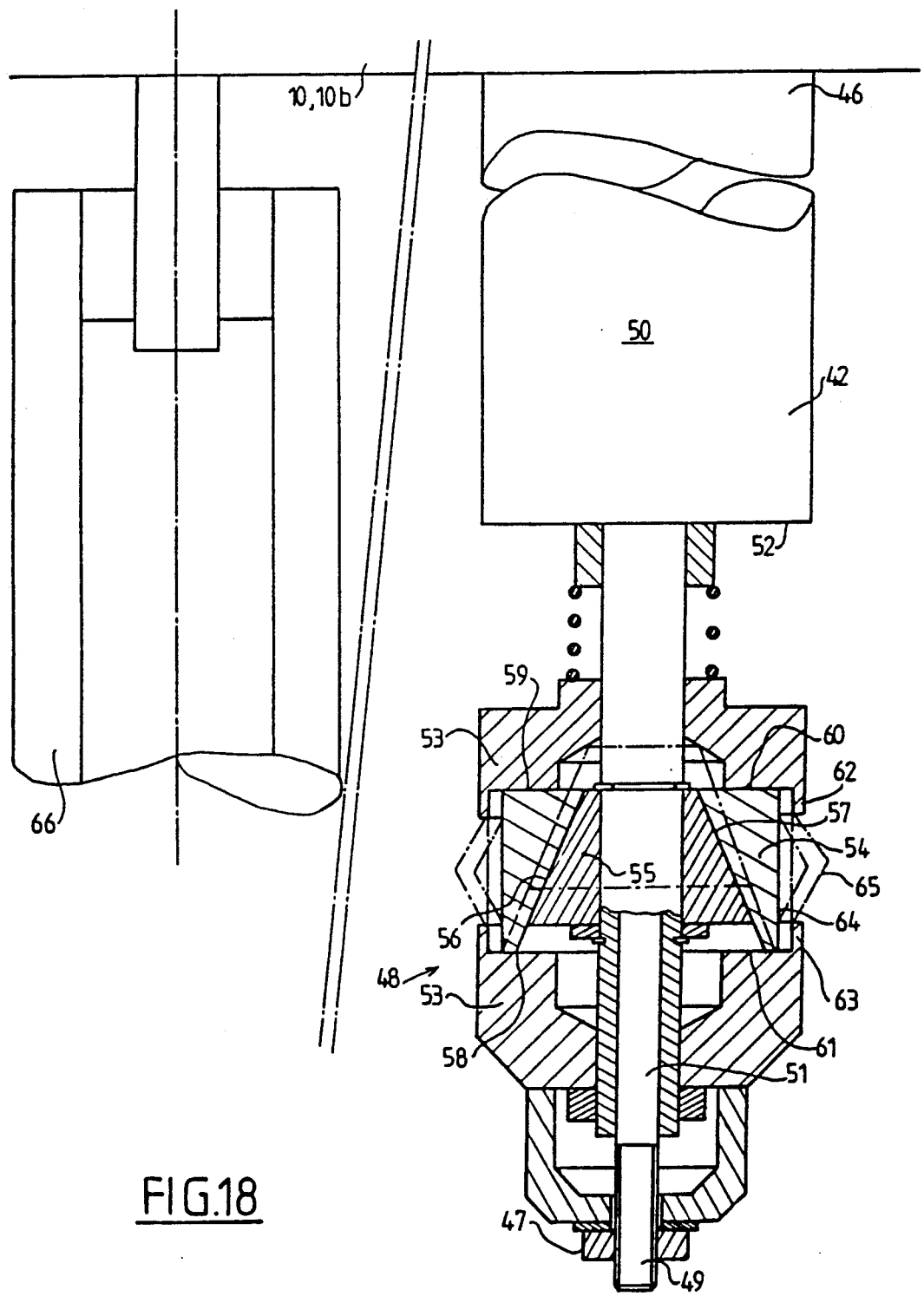

FIG. 18 is a part view, partially in elevation and partially in section, of a carriage according to the invention, illustrating a version of a device for blocking a film reel on the supporting shaft.

Figure 19:
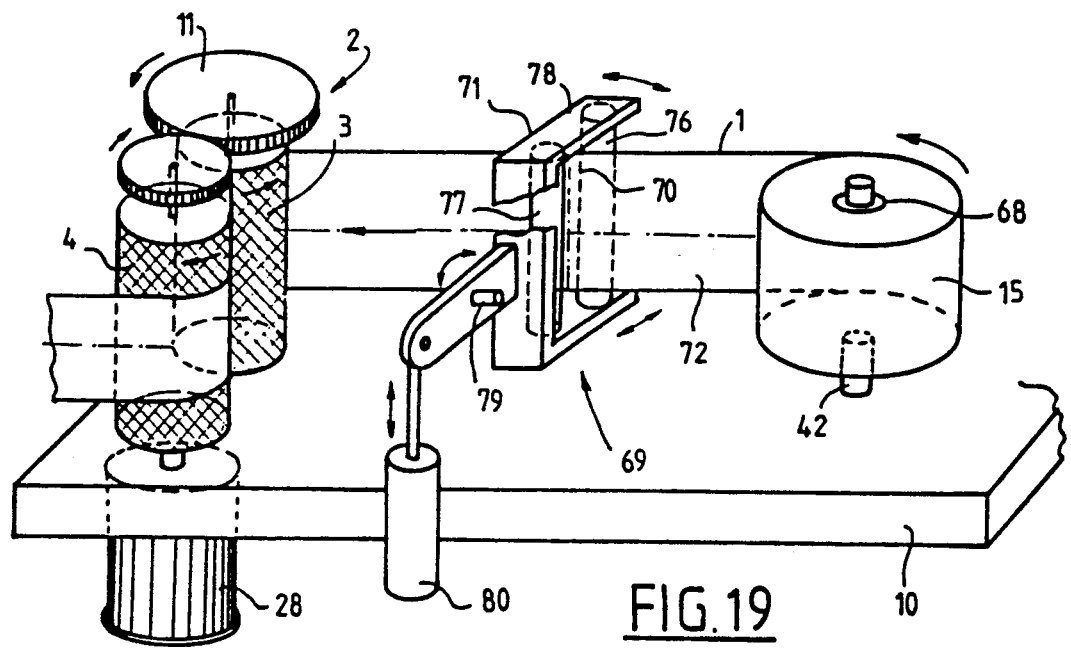

FIG. 19 is a partial diagrammatic perspective view of a carriage according to the invention, illustrating the longitudinal creasing means which it possesses.

Figure 20:
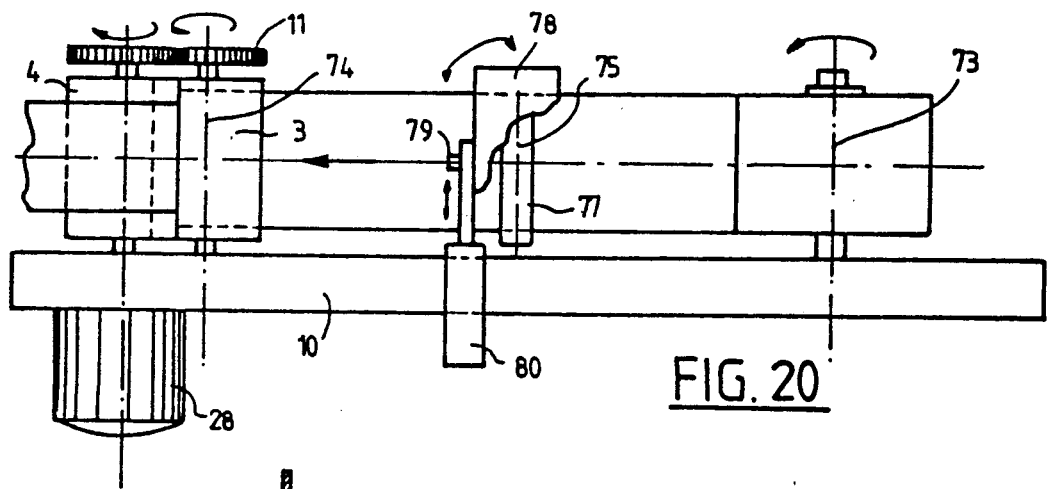

FIG. 20 is an elevation view of the carriage according to FIG. 19.

Figures 21A, 21B, 21C:
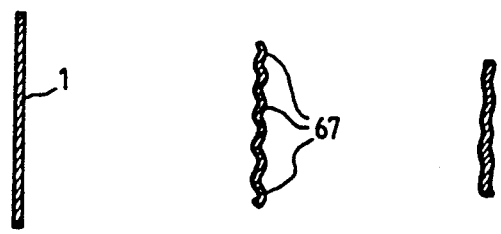

FIGS. 21A, 21B and 21C are three diagrammatic cross-sectional views of a web of the stretchable film used in the invention, in three possible states respectively initially (when stored on or unwound from the reel), after the contraction of the breadth, but before stretching, and finally, after contraction and stretching.

Figure 22:
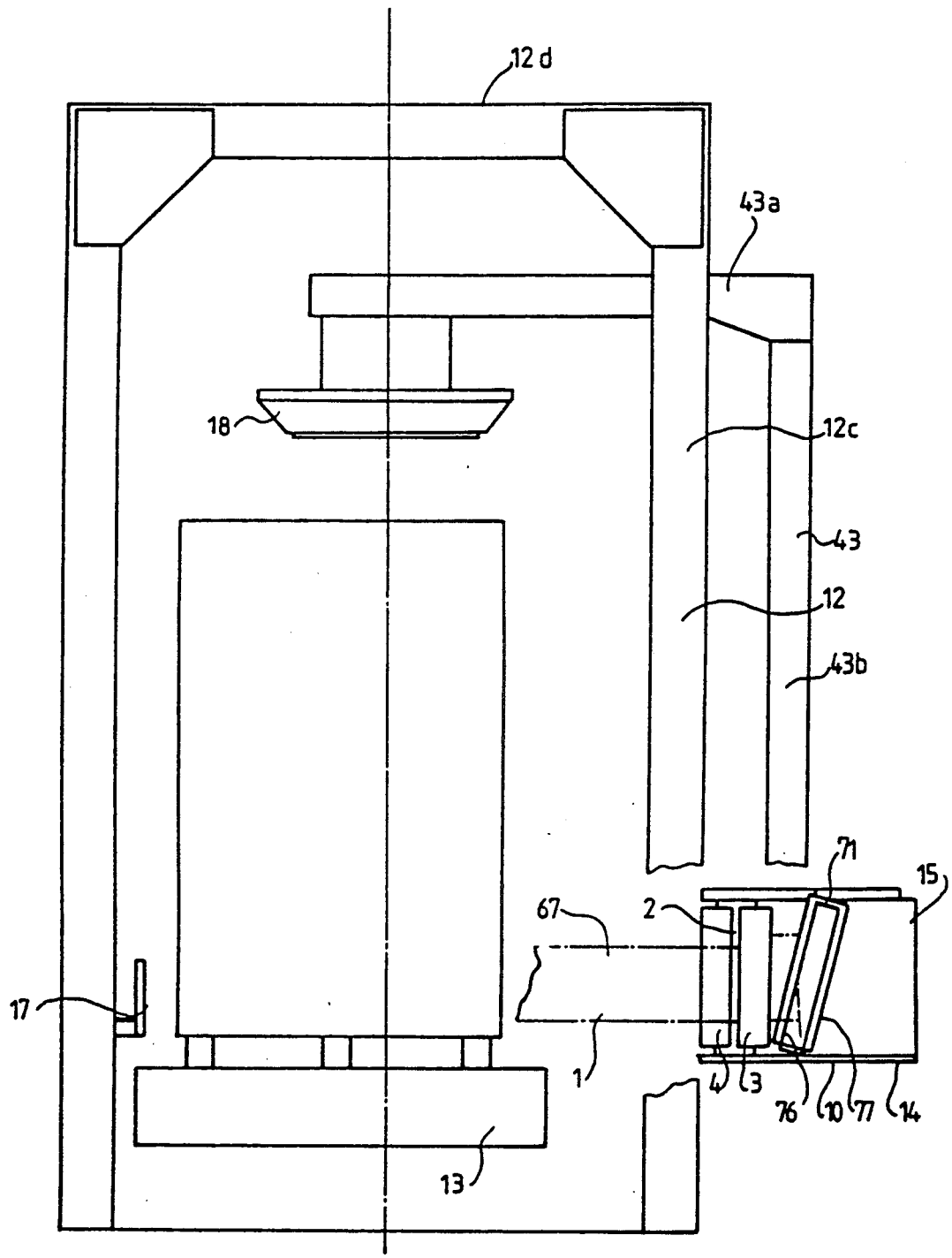

FIG. 22 is a diagrammatic elevation view of a possible version of a packaging machine having a carriage according to the invention (a machine of the rotary arm type).

FIGS. 23A, 23B and 23C are three diagrammatic plan and elevation views of an unwound portion of a stretchable film web, as used in the invention, with three possible degrees: initially, that is to say without a contraction of the breadth, with some contraction of the breadth, and finally with a greater contraction.

FIGS. 24A, 24B and 24C each show four end views of the unwound portion of FIGS. 23A, 23B and 23C respectively in four different successive locations from upstream in the downstream direction, namely the film storage reel, the means for contracting the breadth, the entrance of an upstream prestretching roller and the exit of a downstream prestretching roller.

Figure 25:
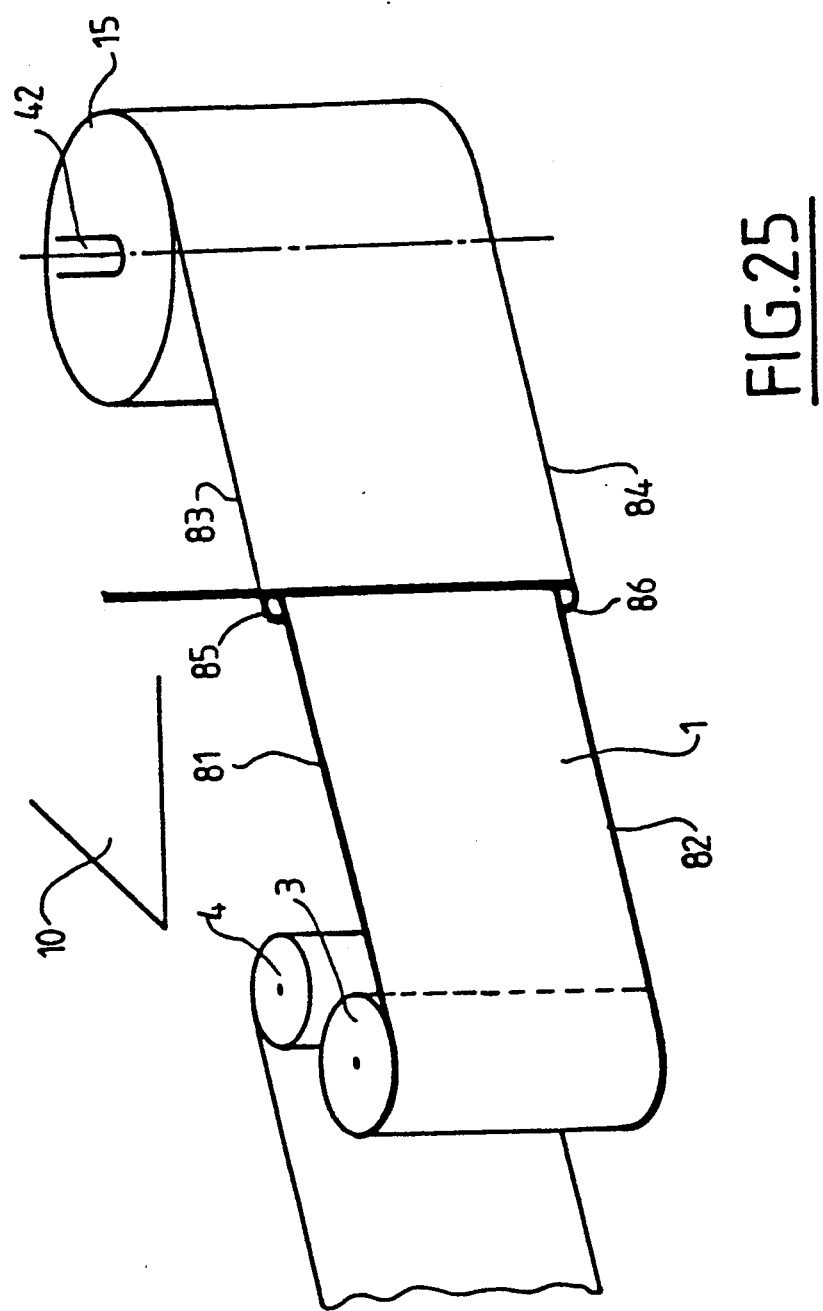

FIG. 25 is a partial perspective view illustrating hooks of a carriage according to the invention for the longitudinal reinforcement of the film web before its stretching.

The invention is concerned with the use of a carriage 14 for unwinding packaging film 1 in web form.

The carriage 14 comprises a stand 10 which supports the various members composing it. A supporting shaft 42 for a film reel 15 is associated with it, in such a way that the film reel can pivot about its axis for the unwinding of the film 1.

The carriage 14 is intended to be incorporated in a machine for packaging a load (FIGS. 13 and 22) by means of the film 1.

This machine comprises a stand 12, means 13 for supporting a load to be packaged with the film 1, the carriage 14 and the means 16 for ensuring the relative displacement of the load in relation to the film 1 or to the reel 15, so as to allow the load to be appropriately covered with the film 1.

Such a packaging machine can be especially of one of the following types: curtain machine; turntable machine; machine with a stationary table and with a reel of an axis rotating about the load; machine with a vertical ring and a track passing through the ring.

As regards the curtain machine (not shown), the packaging involves the vertical faces of the load, such as a palletized load. The load is moved along a horizontal path towards a vertical curtain of film extending in a horizontal direction transversely relative to the direction of movement of the load. The machine is symmetrical in relation to the longitudinal vertical plane, and it has two film reels of stationary vertical axes. The machine possesses two carriages, such as 14, supporting the jaws for the crosscutting and transverse fixing of the curtain of film and, where appropriate, prestretching devices when a prestretched stretchable film is used.

Where a turntable machine (FIG. 13) is concerned, the stand 12 has a base 12a for supporting the table 13 and an offset vertical column 12b carrying the carriage 14 which supports the reel 15, the shaft 42 being vertical. According to one possible version (not shown), the carriage 14 is stationary in the vertical direction, either because the film web 1 has a width equal to the height of the load to be palletized or because the packaging is a local hooping. According to another possible version (as shown), the carriage 14 is mounted slidably upwards and downwards along the column 12b, the sliding movement being coordinated with the rotational movement of the table 13 by driving means 16, such as a motor or geared motor. Such a machine can have additional members, such as grippers for holding the film 1 and cross-cutting and fixing jaws 17 or a presser 18.

As regards a machine with a stationary table and a film reel with an axis rotating about the load (FIG. 22), the stand 12 has vertical pillars 12c placed round the table 13 and supporting a superstructure 12d in their upper end parts. This stand 12 supports in a suitable way a film reel 15 rotatable about the load. In a first version, the movement is only horizontal (at one or more heights or levels). In a second customary version, the movement is helical in order to ensure a helical wrapping of the lateral faces of the palletized load to be packaged. The carriage 14 is carried by a moveable structure 43 particularly supporting the film reel 15 and allowing the reel 15 to move about the load. This structure 43 is, for example, a horizontally moveable arm 43a carried by the superstructure 12d above the load. Located at the end opposite that where this arm is mounted pivotably on the superstructure 12d is a column 43b spaced horizontally apart from the vertical faces of the load, but located opposite it, the carriage 14 thus generally being capable of sliding along this column 43b spaced horizontally apart from the vertical faces of the load, but placed opposite it, the carriage 14 thus generally being capable of sliding along this column 43b (as in FIG. 22). There can also be members, such as grippers, jaws, pressers, 17, 18. According to another example (not shown), the structure possesses a first frame mounted vertically slidably and having guides for a ring carrying the carriage rigidly, the frame having such an orifice that it can be placed round the load. According to another example (not shown), the structure has a ring which is mounted vertically slidably and is capable of surrounding the load and on which is mounted a carriage displaceable along this ring.

The film 1 can have alternative forms: its breadth can be greater or lesser. It can be continuous, without perforation, or perforated in the manner of a net. It can be shrinkable or stretchable. The packaging can cover all the faces of the load or only part of these. The packaging can be single-layer or multilayer in a uniform manner or not. For example, it can comprise an inner wrapping in one direction and an outer wrapping in the opposite direction and crossed. A plurality of wrapping layers can be provided in the vicinity of the non-covered end faces.

The packaging machine can be automatic or manual. The presence of a jaw or a gripper, such as 17, is characteristic of an automatic machine which then possesses a programmed automatic control making it possible to execute programmed cycles adaptable according to the types of load, film 1, packaging to be carried out.

According to a preferred, but not exclusive, alternative embodiment, a stretchable film is used and is stretched beyond its elastic limit before being laid against the load. The packaging machine then has means capable of carrying out this stretching and the packaging process a step involving stretching the film longitudinally. The stretching can be carried out in various alternative ways, especially and preferably by that known in the state of the art as "prestretching" (the document FR-A-2,281,275). In this case, the film 1 is passed through the location of the carriage 14 at an upstream running speed lower than a higher downstream running speed. The prestretched film 1 is then transported to the load. In this case, the machine possesses a prestretching device having generatrices such that the film is displaced from the entrance of the prestretching device to the exit from an upstream running speed to a downstream running speed higher than the upstream speed. This prestretching device is generally located on or associated functionally with the carriage 14. All the alternative embodiments of prestretching devices according to the known state of the art can be considered. For example, the prestretching device can be of the non-motorized type, the drive being obtained by the movement of the film 1 itself. Or it can be of the motorized type with a motor driving the generatrices of the prestretching device. It can be of the type comprising at least one upstream roller and one downstream roller arranged so that the circumferential speed of the downstream roller is higher than that of the upstream roller, or of the type with at least one single roller, the generatrices of which are at a higher circumferential speed downstream than upstream.

Reference will now be made more specifically to FIGS. 1 to 17 which relate to the positioning of a web of packaging film 1 in a roller device 2 comprising, on the one hand, two upstream and downstream main rollers 3, 4 set transversely apart and of parallel axes 3a, 4a parallel, but near one another, defining between them a passage 5 for the film 1 and having an entry orifice 6 and exit orifice 7, said main rollers 3, 4 being designed to pivot simultaneously about their axes 3a, 4a in opposite directions, and, on the other hand, two upstream and downstream film guide rollers 8, 9 of axes 8a, 9a parallel to the axes 3a, 4a associated with the upstream and downstream main rollers 3, 4 and, in their final operational location, being respectively moved away upstream from the entry orifice 6 and downstream from the exit orifice 7, in such a way that, in the roller device 2, the film follows an S-shaped path, going from upstream in the downstream direction from the upstream guide roller 8 to the downstream guide roller 9, passing successively via a particular sector of the upstream main roller 3, the entry orifice 6, the passage 5, the exit orifice 7 and a particular sector of the downstream roller 4. The invention also relates to the carriage 14 of a packaging machine, such as has been described, comprising such a roller device 2 and supported by the stand 10, the main rollers 3, 4 being designed to pivot simultaneously about their axes 3a, 4a in opposite directions by means 11 provided for this purpose.

By convention, in the text the references "upstream" and "downstream" refer to the normal running direction of the film 1. Also, the term "axis" for a roller refers both to the imaginary straight line about which the roller pivots and to the actual shaft or journal allowing this pivoting.

The process for using the carriage 14 having such a device 2 and the carriage 14 according to the invention are intended to be employed within a process or a machine (more generally a device or installation) for the packaging of a load by means of a plastic film in web form, as already described, particularly, but not solely of the type illustrated in FIG. 13.

The carriage 14 supports the reel 15 and, in the vicinity, the roller device 2 according to the invention which preferably functions as a device for the longitudinal stretching of the film 2 and, more especially, for prestretching.

To return to the machine version illustrated in FIG. 13, this functions as follows: the presser 18 carried freely pivotably on an arm mounted on the mast 12a via a vertically sliding carriage is raised. With the table 13 stopped, the load is brought onto it (by means of a conveyor (not shown) or a transporter carriage). The presser 18 is lowered onto the upper horizontal face of the load. The initial end of the film 1 coming from the reel is fastened to the gripper 17. The motors of the means 16 are controlled in such a way that the table 13 is driven in rotation, while the carriage 14 is driven from the vicinity of the gripper 17 (usually near the table 13) to the opposite end of the load (usually the upper horizontal face of the load). The breadth of the film web 1 is a fraction of the height of the load. The setting in motion causes the helical wrapping of the load (its vertical faces). The movements are continued until the carriage 14 returns to its original position. The gripper 17 is designed for holding and transversely cutting the film web 1 and for laying the terminal end of the film 1 against the load or the film web 1 already laid onto the load. The presser 18 can then be raised and the packaged load discharged from the table 13. The film 1 coming from the reel 15 passes over the rollers of the device 2 functioning as a prestretcher. As will be appreciated and as can be seen in FIG. 13, the device 2 is difficult of access, being located on the inner side of the mast 12a (towards the turntable 13), if appropriate between the mast 12a and the load if the table 13 supports such a load. It will therefore be appreciated that it would be expedient to have a more automated positioning of the film web 1 coming from the reel 15, via the roller device 2, in which the path of the film is tortuous and complex (generally S-shaped).

As regards a stretchable plastic film 1 prestretched by means of two prestretching rollers, there are: an upstream roller having a particular upstream peripheral speed and a downstream roller having a higher peripheral speed. Respective upstream and downstream guide rollers associated against the upstream and downstream prestretching rollers respectively, with the film interposed between them, ensure that the film 1 is in contact with the prestretching rollers over a sufficient arc of a circle (for example, approximately 180°). The prestretching rollers preferably have a catching outer surface to prevent or limit the sliding of the film 1 onto them. Moreover, they are generally close to one another, to limit the constriction of the film 1 as a result of its stretching. At the present time, the spacing between the prestretching rollers is greater than necessary for the stretching function, in order to allow access between them for the operator's fingers during the positioning of the film 1. The prestretching rollers can be of the same diameter or of different diameters. They can be positively motorized or driven by the running film. Commands, adjustment, control and monitoring members can also be provided. Furthermore, the stretching can be carried out in a plurality of steps, in which case a plurality of prestretching rollers is provided.

The invention is preferably used when such prestretching devices are employed. In this case, the roller device 2 also forms or is incorporated in the prestretching device. This means that the upstream and downstream prestretching rollers are formed in the same way as and are the same as the rollers 3, 4 of the device 2. Also, the guide rollers of the prestretching device are formed in the same way as and are the same as the rollers 8, 9 of the device 2.

Thus, all the alternative versions known to or within the scope of an average person skilled in the art as regards the prestretching devices with two rollers at differential speeds can be used for the device 2. Or, conversely, the device 2 can have the various structures known to or within the scope of an average person skilled in the art for the prestretching devices with two rollers at differential speeds. Consequently, the structure of the roller device 2 and its various alternative versions or improvements are not described in detail here, insofar as it is identical and common to that of a prestretching device with rollers at differential speeds which is known to or within the scope of an average person skilled in the art. In contrast, the specific features making it possible to adapt such a prestretching device so that it represents the structure and characteristics desired for forming a device 2 according to the invention are described.

Moreover, it must be understood that, although the device 2 is derived from a prestretching device and performs this prestretching function, it can also be independent of or separate from this. In other words, it is conceivably possible for the rollers 3, 4 to have the same peripheral speed, for the film 1 not to be stretched longitudinally during the passage through the device 2, and moreover for the film 1 used not to be a stretchable film. For example, the device 2 can serve only for the correct positioning of the film 1.

The description which follows refers to the instance where the device 2 functions as a prestretcher with two rollers 3, 4 at differential speeds and of the same diameter.

Reference is now made to FIG. 6 (or to FIG. 12 in the form of dot-and-dash lines) which shows a prestretching device, hence the device 2, in its normal operational functioning.

Bearing in mind what was said before, the stand 10 of the carriage 14 supporting the device 2 also supports the film reel 15. The film 1 used in the device 2 according to the invention comes from the film reel 15 preferably located in the vicinity of the device 2, as far as the requirements of access and of overall size allow. The means 11 for driving the rollers 3, 4 consist of the film 1 which is laid against the rollers 3, 4 without sliding and which thereby drive them in rotation during its run, and of separate mechanical and/or electric means ensuring the coupling of the rollers 3, 4 to one another and/or their positive drive. Moreover, these means 11 ensure the pivoting of the rollers 3,4 at the same peripheral speed or, where a prestretching device is concerned, at differential speeds, as already explained.

The starting point is an initial state, in which the guide rollers 8, 9 are relatively displaced from their final operational location to a temporary initial positioning location where they are associated with the main rollers 3, 4 nearest to the entry orifice 6 and the exit orifice 7. In an initial introduction phase, an initial end 19 of the film 1 is introduced between the upstream main roller 3 and guide roller 8 and in the direction of the downstream main roller 4. In a subsequent running phase, the main rollers 3, 4 are pivoted about their axes 3a, 4a, and a particular length of film 1 is made to run in the direction of its introduction into the device 2. And in a final positioning phase, as a result of a relative displacement the guide rollers 8, 9 are brought from their temporary initial positioning location to their final operational location, the effect of this being to bend the film 1, at the same time laying it against said sectors of the main rollers 3, 4.

As seen parallel to the axes 3a, 4a (the plane of FIGS. 1 to 6 and 12), the space between the sectors of the outer lateral surfaces 20, 21 of the rollers 3, 4 spaced apart from, but near to and opposite one another has the general form of a Venturi tube or of a convergent-divergent nozzle. This space defines the passage 5. This passage is narrowest at the location of the generatrices nearest to the surfaces 20, 21 or in the plane P connecting the axes 3a, 4a. This passage 5 is the widest on either side of the plane P substantially in the planes QE and QS tangential to the two surfaces 20, 21, as can be seen in FIG. 12. The entry orifice 6 is on the same side as and near to the plane QE, while the exit orifice 7 is on the same side as and near to the plane QS. An orifice 6, 7 is referred to respectively as an entry or exit orifice according to the direction of rotation of the rollers 3, 4, as represented by arrows in the Figures. For entry, the direction of rotation of the rollers 3, 4 is towards the plane P, while for the exit the direction of rotation of the rollers 3, 4 is in the opposite direction to the plane P.

The temporary initial location of the guide rollers 8, 9 can be seen in FIGS. 1 to 4 and is represented by dashes in FIG. 12. For example, a typical position of the guide rollers 8, 9 in this temporary initial location is such that they are partially in the passage 5; that is to say, they are secant relative to the planes QE and QS respectively, or they are partially opposite the respective sectors of the main roller 3, 4 with which they are not associated. For example, (FIG. 12), the rollers 8, 9, in their temporary initial location, are tangential or substantially tangential to the rollers 3, 4 at the point or in the vicinity of the tangent generatrices of the rollers 3, 4 through planes R and S passing through the axes 4a and 3a respectively. That is to say, these planes R and S passing through the axes 4a, 3a are also substantially tangent planes of each pair of upstream rollers 3 and 8 and downstream rollers 4 and 9.

By the fact that rollers 3, 8 on the one hand and 4, 9 on the other hand are associated with one another is meant that they are arranged in relation to one another so as to be capable of interacting together, with the film 1 placed between them. This association includes the fact that the rollers are tangent (with the exception of the thickness of the film 1) or are near to one another or laid against one another. The notion of tangency is taken to refer to rollers considered in terms of their envelope, in view of the fact that the outer surface of the rollers can be in relief, such as embossed, to prevent the film 1 from sliding.

To bring the guide rollers 8, 9 from their final operational location to their initial operational location, their axes 8a, 9a are moved substantially to pivot about the axes 3a, 4a, each by a fraction of a revolution, especially a half-revolution or substantially a half-revolution, particularly a little more than a half-revolution, in the direction of rotation of the rollers 3 and 4 respectively.

The initial introduction phase is illustrated in FIG. 1. The film 1, more specifically its initial end 19, is brought from the opposite side towards the main roller 4 substantially in the plane R already defined.

The subsequent phase is illustrated in FIGS. 2, 3 and 4 in three successive states. The pivoting of the roller 3 and the association with the guide roller 8 or the inherent drive of the film 1 cause the running of the film 1, the initial end 19 of which approaches and then comes in contact with the outer surface 21 of the roller 4, especially substantially along or in the vicinity of the generatrix 22 of intersection of the plane R with the outer surface 21 (called the impact generatrix). The pivoting movement of the roller 4 and the friction between the film 1 and the roller 4 cause the end 19 to be driven towards the narrowed part of the passage 5, and then from this towards the other guide roller 9 located in or in the vicinity of the exit orifice 7 (FIG. 2). Because of the pivoting direction of the rollers 3, 4 and 9, the film 1 (namely its end 19) is prevented from passing between the rollers 3 and 9 and, on the contrary, is stressed so as to pass between the rollers 4 and 9 (FIG. 3). The running movement of the film 1 can then be continued, and the length of film 1 projecting from between the rollers 4, 9 is then at least equal to the fraction of circumference of the roller 4 against which the film 1 is to be laid during normal operation (FIG. 4) or, more generally, at least equal to that of the path of the film 1 in the device 2. For this purpose, during the subsequent running phase, the main rollers 3, 4 are pivoted about their respective axes 3a, 4a respectively by at least a fraction of a revolution.

The final phase is illustrated in FIG. 5, corresponding to an intermediate situation of the guide rollers 8, 9 between the temporary initial location (FIGS. 1 to 4) and the final operational location (FIG. 6). For this purpose, the guide rollers 8 and 9 are displaced pivotally about the axes 3a and 4a respectively in opposite and the same directions to the directions of rotation of the main rollers 3 and 4, with movements equal and opposite to the initial movements which brought the same rollers 8, 9 from their final operational location to the temporary initial location. During this movement of the guide rollers 8, 9 as far as their final operational location, they retain the film, and the effect of this is to lay the film progressively onto the sectors of the outer surfaces 20 and 21 of the rollers 3 and 4 contained substantially between the temporary initial locations and the final operational locations.

The final operational locations of the guide rollers 8, 9 are respectively set apart from the entry orifice 6 and exit orifice 7, so that the film 1, as it passes from the roller 8 to the roller 4, follows a path in the form of a more or less open or closed S. Moreover, this path becomes possible to obtain easily, quickly and reliably, without the operator having to insert his fingers into the passage 5. In the passage 5, the film 1 follows a path coinciding substantially with the tangent plane connecting the rollers 3 and 4 in this passage 5.

The device 2 is symmetric relative to an axis of symmetry 23 located in the passage 5 at the intersection of the plane P and of a plane T located between and equidistant from the rollers 3, 4. In this case, in the final positioning phase, a relative displacement of the guide rollers 8, 9 and main rollers 3, 4 is carried out simultaneously.

The upstream and downstream guide rollers 8, 9 are allowed permanently to pivot freely about their axes 8a, 9a. These rollers 8, 9 are therefore driven as a result of friction with the running film. Furthermore, during the running phase, the main rollers 3, 4 are positively driven to pivot about their axes 3a, 4a.

In the temporary initial positioning location, the guide rollers 8, 9 are brought into the entry and exit orifices 6, 7 respectively. More especially, the rollers 8, 9 are spaced transversely apart from the main rollers 3, 4 by a distance at least equal to the order of thickness of the film. That is to say, the spacing of the main rollers 3, 4 and of the associated guide rollers 8, 9 is substantially equal in the two initial and final locations.

During the initial introduction phase, the main rollers 3, 4 are positively driven to pivot. During the same running phase, the initial end 19 of the film 1 is grasped downstream of the passage between the downstream main roller 4 and the downstream guide roller 9, as soon as the downstream guide roller 9 is in its temporary initial positioning location, and it is pulled in its running direction by exerting a pull on it. This pull is represented by the arrow F1 in FIG. 3. This pull is intended for controlling the run of the film 1. It can be exerted manually. There is no danger in this since the operator's fingers go in a direction away from the rollers 9, 4 which themselves pivot at this point in opposite directions to the pinching of fingers. Conversely, to give the film some tension, but in any event to prevent it from being slack, a particular retaining tension is exerted on the film 1 upstream in the opposite direction to its run. This retaining tension is represented by the arrow F2 in FIG. 3. It can be exerted automatically by means of a slight braking as a result of friction exerted on the film reel 15 from which the film 1 has come.

In the final positioning phase, a relative displacement of the guide rollers 8, 9 and of the main rollers 3, 4 is obtained by keeping the guide rollers 8, 9 in the vicinity of the main rollers 3, 4. Alternatively, the guide rollers 8, 9 are in the vicinity of the main rollers 3, 4 only in the two initial and final end locations, but are set apart from them in the intermediate locations. At least in the final operational location, the guide rollers 8, 9 are brought substantially against, especially to bear against the main rollers, with the film 1 interposed between them. But this bearing is generally also carried out in the initial location and in the intermediate locations.

Because there is no need to have access to the passage 5, it is possible to reduce the spacing between the rollers 3 and 4 strictly to a minimum, and therefore the main rollers 3, 4 are arranged with a transverse spacing substantially equal to the minimum distance allowing the film 1 to run between the two of them. This constructive characteristic is especially important when the device 2 is also a prestretcher, because it makes it possible to reduce the length of film 1 in the passage 5 and therefore the constriction occurring as a result of the longitudinal stretching.

In the final positioning phase, the axes of a first pair of main rollers 3, 4 and guide rollers 8, 9 are kept stationary and the axes of a second pair of guide rollers 8, 9 or main rollers 3, 4 are displaced. In the version described, the axes, 3a, 4a of the main rollers 3, 4 are kept stationary and the axes 8a, 9a of the guide rollers 8, 9 are displaced. The invention also makes it possible to keep the axes 8a, 9a of the guide rollers 8, 9 stationary and to displace the axes 3a, 4a of the main rollers 3, 4 or to displace the axes 3a, 4a, 8a, 9a of both the pair of main rollers 3, 4 and the pair of guide rollers 8, 9.

According to a first alternative embodiment (not shown), the main rollers 3, 4 are driven positively by means of the running movement of the film 1 itself, and action is taken on the film 1 in order directly to drive it positively. For example, a pull is exerted on the film 1 downstream, especially by means of the load to which the film 1 is attached. According to a second alternative version (FIG. 7) designed more especially for the situation where the device 2 is also a motorized prestretcher, the main rollers 3, 4 are directly driven positively and these allow the film 1 to run. A motor or geared motor 24 is used for this purpose.

When there is no longitudinal stretching (or prestretching), either because the device 2 is not intended to function as a prestretcher or because that is its intended use, but it does not function as such, especially temporarily, the peripheral pivoting speeds of the main rollers 3, 4 are identical. The invention also relates to the instance where the peripheral pivoting speeds of the main rollers 3, 4 are different. In particular, the ratio between the peripheral speeds of the main rollers 3, 4 is kept substantially constant, the peripheral speed of the downstream main roller being higher than that of the upstream roller.

The film 1 and the main rollers 3, 4 are displaced simultaneously, without any substantial relative sliding, in the running direction of the film 1.

Contrary to the devices which provide for moving the main rollers 3, 4 apart in order to position the film, these remain in the immediate vicinity of one another during the entire positioning process.

The device 2 making it possible to carry out the process just described forms part of a carriage 14, and it is supported by a stand 10. It comprises the two upstream and downstream main rollers 3, 4 of axes 3a, 4a supported by the stand 10 and the two upstream and downstream guide rollers 8, 9 already described. This device possesses, carried by the stand 10, means 25 for displacement with blocking, which are capable of allowing a relative displacement, with blocking in one of the two end positions, of the guide rollers 8, 9 in relation to the axes 3a, 4a of the main rollers 3, 4, the guide rollers 8, 9 being either in the final operational location or in a temporary initial positioning location, where they are associated with the upstream and downstream main rollers 3, 4 respectively nearest to the entry orifice 6 and the exit orifice 7 of the passage 5.

In the preferred example, the main rollers 3, 4 form part of a system for the longitudinal stretching of the film. The stand 10 preferably comprises two parallel plates 10a, 10b spaced apart and facing one another. Since the device 2 is a motorized prestretcher, the means 11 can comprise, keyed on the axes 3a, 4a, pinions 26, 27 in engagement on one another and driven by a motor 28 carried by one of the plates, for example 10a. These pinions 26, 27 are arranged so as to allow the desired speed ratio. For example, as regards prestretching rollers 3, 4 of the same diameter, the upstream pinion 26 is of larger diameter than the downstream pinion 27.

The means 25 can have a plurality of alternative embodiments. In a first version (FIGS. 7, 8, 10 and 11), each guide roller 8, 9 is carried by means of its axis 8a, 9a at the two ends 29 of two links 30 parallel to one another and to the plates 10a, 10b and orthogonal to the axes 8a, 9a. These two links 30 are mounted at their other two opposite ends 31 so as to pivot freely on the axes 3a, 4a. The links 30 are simultaneously driven preferably for the two rollers 8, 9. For example, the links 30 near the plate 10b are fastened to sleeves 32 mounted on the axes 3a, 4a. Respective cylinders 33, 34 for the two rollers 8, 9 are mounted keyed on the sleeves 32. A belt 35 is in engagement with and drives the two cylinders 33, 34. It is driven in turn by a drive cylinder driven by a motor or geared motor 37 fastened to the plate 10b. The roller 33, 34/belt 35/roller 36 assembly can be replaced by any equivalent assembly with a gear, pulley, chain, etc., capable of making the interconnection of the links 30 of the two rollers 8, 9 via a driving member 27, ensuring selective driving and blocking in the desired positions.

According to a second version (FIGS. 14 and 15), the means 25 comprise a frame 38 pivotably mounted substantially at the center 23 of the passage 5 between the main rollers 3, 4, said frame 38 supporting the axes 8a, 9a at its two opposite ends 39, 40, a driving member 27 ensuring the selective driving and blocking of the frame 38. The frame 38 is preferably designed to be of adjustable width, that is to say it makes it possible to space apart or bring together (with blocking) the axes 8a, 9a, bearing in mind that the spacing between the axis 23 and the axes 8a, 9a varies between the two initial and final locations. This adjustment is obtained by electric or pneumatic sliding means 39.

According to a third version (FIG. 16), the means 25 comprise two rings or pairs of rings 40 supporting the axes 8a, 9a fixedly and separately, these rings being carried and guided by cylinders 41, a driving member 27 ensuring the selective driving and blocking of the rings 40. Associated with each roller 8, 9 are one or two rings 40 carried by the cylinders 41 fastened to the plates 10a, 10b. Complete rings 40 can also be replaced by ring sectors. This version has the advantage of freeing the axes 3a, 4a of the main rollers 3, 4.

A fourth version (FIG. 17) is derived from the first. Instead of the links 30 being articulated about the axes 3a, 4a, they are articulated about axes 44, 45 located at their ends 31, these axes 44, 45 being set apart from the rollers 3, 4 and each substantially in the mid-plane of the end positions of the axes 8a, 9a respectively. There are also means for driving the links 30 about their axes 44, 45, such as pulleys, belt, gears, etc. In this version, the rollers 8, 9 (or their axes 8a, 9a) execute substantially three quarters of a revolution from one of their two end positions to the other.

Whatever the particular alternative embodiment, the upstream and downstream main rollers 3, 4 are preferably spaced from one another at the minimum distance necessary for the film 1 to pass between them for the purpose of its longitudinal stretching.

Reference is now made to FIG. 18 which relates to the positioning of the film reel 15 on the carriage 14, especially the supporting shaft 42.

The supporting shaft 42 is retained rigidly and perpendicularly by means of its two end parts, namely the upper end part 46, on the stand 10, namely the upper plate 10b. At the location of the supporting shaft 42 and of the reel 15, the stand 10 is without a lower plate 10a, so as to allow a film reel to be mounted by axial sliding.

The description refers to the instance where the reel has a vertical axis, the supporting shaft 42 itself being vertical and being carried by a vertically movable carriage 14, thus corresponding to machines such as those with a turntable and a rotary reel.

In its lower end part 47 which is opposite that 46 where the supporting shaft 48 is associated with the stand 10 and which is free since it is without a plate, such as 10a, the supporting shaft 42 has an automatic device 48 for the blocking of the film reel 15. The free end part 49 projecting axially downwards opposite the plate 10b forms a control.

The supporting shaft 42 comprises a guide bush 50 fastened rigidly to the stand 10, especially perpendicularly; a rod 51 mounted axially slidably in the bush and projecting from its end 52 opposite the stand 10; radial guide members 53 associated with the rod 51; blocking members 54 mounted to be guided by and in the radial guide members 53, so as to be capable of being displaced radially between two end positions nearest to and furthest away from the rod 51 respectively, these two positions corresponding to the respective inactive and active states of the blocking device 48; and a driving member 55 associated with the rod 51 and acting on the blocking members 54 in order, as a result of the axial sliding of the rod 51, to make it possible to obtain the radial displacement of the blocking members 54.

The driving member has a general frustoconical form with a lateral surface 56 forming a ramp, on which slides a complementary ramp 57 likewise of the general frustoconical form of the blocking members 54.

The blocking members 54 can have the form of a cylindrical sector limited by two transverse faces 58, 59 perpendicular to the axis of the shaft 42 and sliding on complementary guide surfaces 60, 61 of the two respective lower and upper guide members 53a and 53b equipped with axial turned-up portions 62, 63 directed towards one another in order to prevent any inopportune disconnection of the blocking members 54 from their guides. The blocking members 54, on their cylindrical outer face 64, can have pointed projections 65 for securing the film reel by means of its inner journal (not shown).

In FIG. 18, the device 48 is represented in the inactive state by unbroken lines, the pointed projections 65 being retracted between the projections 62 and 63 and not substantially going beyond the envelope of the bush 50 and of the radial guide members 53 which are in the extension of this. Dot-and-dash lines represent the driving member 55 and the blocking member in the active position, the pointed projections 65 then effectively projecting and being capable of securing the inner journal supporting the film reel 15.

On the stand 10 there is also a member for releasing the blocking device (not shown), making it possible to act on the driving member 55 in order to return it to the inactive state.

FIG. 18 shows diagrammatically, in the vicinity of the shaft 42 and the device 48, a roller 66 of parallel axis which is carried by a plate 10b and which can be a roller of a prestretching device or of a device, such as the device 2 already described.

Where the phase for associating the film reel 15 with the supporting shaft 42 is concerned, this starts from an initial situation in which the device 48 of the supporting shaft 42 is in the inactive state, the shaft 42 being without a reel 15. Subsequently, the film reel 15 and the supporting shaft 42 are arranged at least substantially coaxially, but apart from one another along their common axis. An axially directed relative displacement of the supporting shaft 42 and the film reel 15 is obtained in order to cause them to interact with one another until a suitable force exerted axially on the free end part of the shaft forming a control 49 automatically causes the automatic blocking device 48 to change to the active state. Thereafter, the carriage 14 is brought to its operating location as a result of a single axial sliding displacement. For the relative displacement of the supporting shaft 42 and the film reel 15, the reel 15 is kept stationary in the axial direction and the supporting shaft 42 is made to slide in the axial direction.

A force is exerted on the free end part forming a control 49 of the blocking device 48 by putting this free end part 48 in contact with a bearing surface at the end of the sliding stroke of the supporting shaft 42. This bearing surface can be a surface for the axial blocking of the film reel 15 opposite the supporting stand of the supporting shaft or a transverse wall of the supporting journal of the film reel 15.

Reference is now made to FIGS. 19 to 24 which relate to the reduction in breadth of the film 1.

The process under consideration makes use here expressly of a stretchable plastic film. Regarding the phase of unwinding the film 1, continuously and successively: the supply of film 1 in web form, of original breadth L, is ensured by running in the longitudinal direction, in such a way that the film web 1 is tensioned substantially. Action is taken on the film web 1 to cause it subsequently to have a reduced breadth 1 smaller than L. Action is taken on the film web 1 of reduced breadth to obtain some longitudinal stretching. The stretched film web 1 is transported as far as the load and laid against the load to ensure its packaging.

Action is taken on the film web 1 in order to cause it to have a reduced breadth by making on the film web 1 substantially longitudinal creases 67 distributed substantially uniformly over the entire width of the film web 1, said creases 67 subsequently experiencing some rolling during the longitudinal stretching.

This purpose is served by a carriage 14 which has means for supplying stretchable film in web form, of original breadth L, comprising means 42 for supporting a film reel 15; means 68 ensuring that the stretchable film web 1 has some tension; means 69 capable of restricting the breadth of the film web in order to cause it to have a reduced breadth 1 smaller than L; means 2 capable of ensuring some longitudinal stretching of the film web 1 of reduced breadth, which are located downstream of the means 69 for restricting the breadth and which comprise at least one stretching roller of an axis parallel to that of the film reel 15; means capable of ensuring the longitudinal displacement of the film web. The means 69 capable of restricting the breadth of the film web 1 consist of a slit 70 of a creasing member 71 over which the film web 1 slides, the longitudinal direction of the slit 70 being inclined at an acute angle relative to the axis of the film reel and to the axis of the stretching roller.

FIG. 22 illustrates the invention relating to the creasing and put into practice on a machine of the type with a stationary table and a reel rotating about the load.

Numerous substantially longitudinal and mutually adjacent creases are made in the web 1, thereby effecting a substantially transversely directed puckering cf the film web 1. The film web 1 is stretched beyond its elastic limit. More particularly, the film web 1 is stretched well beyond its elastic limit. If appropriate, some transverse stretching is carried out at least substantially simultaneously with a longitudinal stretching of the film 1. Preferably the film web 1 is stretched immediately or a very short time after the breadth has been reduced. Or a minimum or a very short length of film web 1 is left between the point of supply of the original breadth L and the stretching point. To ensure the supply of film 1 in web form of original breadth L, a film web is unwound from a film reel 15; and to ensure some longitudinal stretching of the film web 1, it is made to run from an upstream zone at a first upstream running speed to a downstream zone at a second downstream running speed higher than the first upstream running speed. The positioning of the film reel 15 becomes easier by adopting the above-described technique. The prestretching of the film can be carried out by means of the device with two rollers of differential speeds, as already mentioned.

To act on the film web 1 so as to have substantially longitudinal creases 67 distributed substantially uniformly over the entire width of the web, there is ensured, in a transverse zone of a running portion 72 defined by two respective upstream and downstream reference traces 73 and 74 of the web 1 which are parallel to one another and transverse in relation to the web 1, a forced and localized guidance of the running web 1 according to an intermediate deformation trace 75, this trace 75 being substantially orthogonal to the longitudinal direction of the web 1 and inclined at an acute angle relative to the reference traces 73, 74, in such a way that the running web 1 undergoes, from the upstream reference trace 73 to the intermediate trace 75, a first twist of a fraction of a revolution and, from the intermediate trace 75 to the downstream trace 74, a second twist opposed to the first twist, the web 1 being stressed during its forced guidance so as to contract in its transverse direction, creasing at the same time. To ensure a forced guidance of the web 1 according to an intermediate trace 75, the running web 1 is passed through a slit 70, the longitudinal direction of which corresponds at least substantially to or determines the intermediate trace. To ensure that the web 1 has a substantially tensioned state, the film reel 15 is restrained slightly. The web 1 is passed between the film reel 15 and a roller of a stretching device 2, of axes parallel to one another and defining the respective upstream and downstream reference traces 73 and 74 through a slit 70 of a creasing member 71, the longitudinal direction of the slit being inclined at an acute angle relative to the axes of the film reel 15 and of the roller of the stretching device 2. The sliding of the film web 1 on the creasing member 71 is obtained. In particular, preferably with a minimum of friction. The reduced breadth 1 is adjusted in relation to the original breadth L by adjusting the angle of inclination of the intermediate trace 75 relative to the upstream and downstream reference traces 73 and 74, all things otherwise being equal, the reduced breadth 1 being the smaller, the larger the angle of inclination. Reference may be made, in this respect, to FIGS. 23A, 23B, 23C, 24A, 24B and 24C. As regards FIGS. 23A and 24A, the slit 70 is not inclined and there is no creasing. Where FIGS. 23B and 24B are concerned, the slit 70 is inclined at approximately 30° relative to the vertical and there is some creasing which, however, is less than that obtained in respect of FIGS. 23C and 24C, where the slit is inclined at approximately 60° relative to the vertical.

For conventional uses, the angle of inclination of the intermediate trace 75 relative to the upstream and downstream reference traces 73 and 74 is between 30° and 60°.

According to one possible version, the load is packaged with the film 1 by adjusting the reduced breadth to a constant value.

According to another version, the load is packaged by changing the reduced breadth according to the zones of the load to be packaged.

Moreover, preferably or where appropriate, the degree of stretching is adjusted as a function of the value of the breadth, and in particular the degree of stretching is increased when the breadth is reduced.

The creasing member 71 consists of two stationary rods or rollers 76, 77 parallel to and set transversely apart from one another, spaced so as to form the slit 70 and carried by a supporting frame or equivalent 78. These rods or rollers 76, 77 have a metallic or polished surface capable of allowing the film 1 to slide, with a minimum friction of the film web. Preferably, the rods or rollers 76, 77 are relatively close to one another, so that the inclination of the slit 70 corresponds relatively exactly to that of the trace 75, so as to control the degree of creasing accurately. A common plate forming part of the stand 10 supports the supporting shaft 42 of the film reel 15, the stretching means 2 and the supporting frame 78. The supporting frame 78 is carried pivotably, but blockably on the plate about an axis 79 orthogonal to the slit 70. A member 80 for driving with blocking, such as a pneumatic jack, acts on the supporting frame 78 in order to put it in a particular given position in relation to the axis 79a which determines the inclination of the slit 70.

Reference is now made to FIG. 25 which illustrates the means of safety against the tearing of the film 1. In fact, the use of the stretchable film, prestretched and highly stretched beyond its elastic limit and thin, for the purpose of making creases, such as 67, risks causing the tearing of the film 1. In view of this, in the unwinding phase at least two longitudinal creases 81, 82 are made on the two longitudinal edges 83, 84 of the film web 1 in order to prevent it from tearing. The creases 81, 82 are single or multiple. In principle, a single crease is sufficient, the longitudinal free edge of the film web no longer being formed by the free and therefore tearable edge of the film itself. The carriage 14 is thus equipped with two hooks 85, 86 or equivalent which are arranged upstream of a prestretching roller device 2 and which are located in a plane transverse relative to that of the film web 1 and on which the longitudinal edges 83, 84 of the film web 1 slide, in order to make two longitudinal creases 81, 82 on these for the purpose of preventing the tearing of the film web 1.

These hooks 85, 86 are also preferably placed in the immediate vicinity of and at the exit of the film web 1 upstream of the creasing member 71. In contrast with the creasing member 71 which substantially reduces the breadth of the film 1, this is not true of the hooks 85, 86 which only make the desirable creases 81, 82. The hooks 85, 86 can be carried by a bracket 87 fastened to the stand 10. For the sake of simplification, FIG. 25 does not show the creasing means and those for positioning the film 1 between the prestretching rollers 3, 4.

We claim:

1. A process using a carriage for unwinding packaging film, said carriage including a stand, a support shaft for a film reel to allow the rotation of said reel and the unwinding of said film and a roller device including a roller rotatable about an axis generally parallel to said reel's supporting shaft, said carriage incorporated in a packaging machine having
    a) an initial phase for associating said reel with said supporting shaft;
    b) a subsequent phase for positioning said web of packaging film in said roller device; and
    c) a phase of unwinding said film for the packaging of said load;

said process applicable to said unwinding phase, and comprising continuously and successively performing the following steps:

i) moving said film in web form, of original width "L", in the longitudinal direction in such a way that said film web is substantially tensioned by said roller device;

ii) deforming said film web by twisting prior to entering said roller device to cause said web subsequently to have a smaller reduced width "l" while maintaining the film in a substantially flat condition and while maintaining a substantial portion of the original width "L" and ensuring some longitudinal stretching resulting from said deformation;

iii) and transporting said stretched film web as far as said load and laying said stretched film web against said load to ensure its packaging, and further including in step ii causing said deformation by forming substantial longitudinal creases distributed substantially uniformly over the entire width of said film web, said creases subsequently undergoing some rolling during longitudinal stretching of said film in said roller device.

2. The process of claim 1, wherein, said deformation step occurs between said roller device and said film reel by forcing said web at an intermediate position to be inclined at an acute angle relative to the longitudinal position of said web at said film reel and said roller device in, in such a way that said web undergoes, from the upstream film reel to said intermediate position, a first twist of a fraction of a revolution and, from said intermediate position to said downstream roller device, a second twist opposed to said first twist. so that said web is stressed at its intermediate position by contact in said web's transverse direction while creasing at the same time.

3. The process of claim 2, wherein the reduced width of said web is adjusted in relation to its original width by adjusting the angle of inclination of said web position relative to the upstream and downstream web position so that the reduced width becomes smaller, when the angle of inclination increases.

4. The process of claim 1 further including the step of folding the exposed longitudinal edges of said web at a position adjacent said film reel and upstream of said step where said creasing occurs.

5. The process of claim 1 wherein said web width is varied while said film is wrapped about said load.

6. The process of claim 1 wherein said film is stretched in said roller device beyond its elastic limit.

7. A process using a carriage incorporated in a packaging machine for unwinding packaging film, said carriage including a stand, a film reel rotatable about an axis for unwinding of said film and a roller device for longitudinally tensioning said film and including a roller rotatable about an axis generally parallel to said film reel's axis, said process continuously and successively performing the following steps:

i) moving said film in web form, of original width "L", in the longitudinal direction in such a way that said film web is substantially tensioned by said roller device;

ii) deforming said film web prior to entering said roller device to cause said web subsequently to have a smaller reduced width "l", said deformation step occurring between said roller device and said film reel by forcing said web at an intermediate position to be inclined at an acute angle relative to the longitudinal position of said web at said film reel and said roller device so that said web undergoes, from the upstream film reel to said intermediate position, a first twist of a fraction of a revolution and, from said intermediate position to said downstream roller, a second twist opposed to said first twist whereby longitudinal creases are distributed substantially uniformly over the entire width of said film web; and iii) transporting said stretched film web as far as said load and laying said stretched film web of reduced width "l" against said load to ensure its packaging, said creases subsequently undergoing some rolling during longitudinal stretching of said film in said roller device.

8. The process of claim 7, wherein the reduced width of said web is adjusted in relation to its original width by adjusting the angle of inclination of said web position relative to the upstream and downstream web position so that said reduced with becomes smaller when the angle of inclination increases.

* * * * *